D. ELLIOT & E. SEELY.
WASHER FOR LOCK NUTS.
No. 74,060. Patented Feb. 4, 1868.
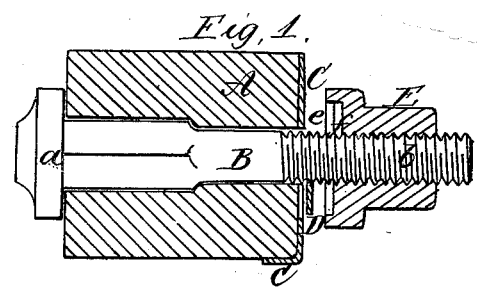
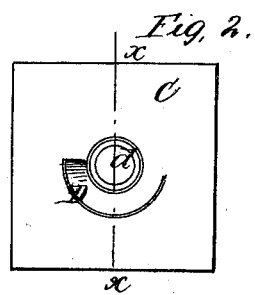
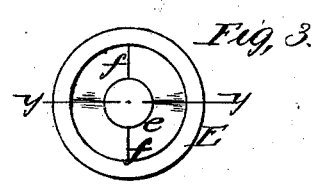
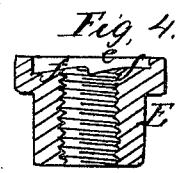
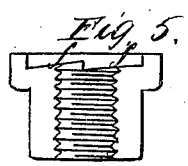

United States Patent Office.

D. ELLIOT AND E. SEELY, OF NEW YORK, N. Y.

*Letters Patent No. 74,060, dated February 4, 1868.*

IMPROVEMENT IN WASHER FOR LOCK-NUTS.

*The Schedule referred to in these Letters Patent and making part of the same.*

TO ALL WHOM IT MAY CONCERN:

Be it known that we, D. ELLIOT and E. SEELY, of the city, county, and State of New York, have invented a new and improved Pawl-and-Ratchet Attachment for the Nuts of Screw-Bolts, and that the following description, taken in connection with the accompanying drawings, hereinafter referred to, forms a full and exact specification of the same, wherein we have set forth the nature and principles of our said improvements, by which our invention may be distinguished from all others of a similar class, together with such parts as we claim and desire to have secured to us by Letters Patent.

This invention relates to a new and improved pawl-and-ratchet attachment for the nuts of screw-bolts, whereby the nuts are prevented from casually loosening or becoming unscrewed.

The invention consists in a novel manner of constructing the pawl on the washer of the bolt, and in forming the ratchet on the nut, as hereinafter fully shown and described, whereby a very economical device for the purpose specified is obtained. In the accompanying sheet of drawings—

Figure 1 is a side sectional view of a washer and nut pertaining to our invention, taken in the line $x\ x$, fig. 2, the bolt not being in section, but the wood or article through which the bolt passes being bisected in the same line as the washer and nut.

Figure 2, a face view of the washer.

Figure 3, an inner end view of the nut.

Figure 4, a section of the nut taken in the line $y\ y$, fig. 3.

Figure 5, a section of the nut taken in the same line $y\ y$, and showing a modification of the ratchet-teeth.

Similar letters of reference indicate like parts.

A represents a piece of wood, or other article, through which a screw-bolt, B, passes. This bolt may be constructed in the usual manner, $a$ being the head at one end, and $b$ the screw at the opposite end. C represents a washer constructed of sheet metal, and fitted over the screw-end of the bolt. This washer should be prevented from turning on the bolt, and various plans may be devised for that purpose. For instance, one end or edge of the washer may be turned or bent over one edge of the wood A, as shown at $c$ in fig. 1, or the washer may be punched, so as to form a burr to fit in a countersink in A. In striking, punching, or cutting out the washer, a curved slit is made concentric with the central hole $d$, and this slitted portion is bent or curved upward to form a pawl, D, which is shown clearly in figs. 1 and 2. E represents the nut of the bolt, which is constructed with a chamber, $e$, in its inner end, to receive the pawl D when the nut is screwed on the bolt. The bottom of the chamber $e$ is toothed to form a ratchet, and these teeth, designated by $f$, slip or work over the pawl D when the nut is being screwed on the bolt, but the pawl prevents the nut from casually unscrewing.

We design, in practice, to have the ratchet-teeth $f$ of the nut constructed in two different ways, one with edges in line or parallel with the axis of the bolt, (see fig. 5,) so that the nut cannot be unscrewed, even by the application of a wrench, without breaking off the pawl D. Teeth constructed on the nut in this way are to be used in those cases where it is not necessary to unscrew the nut at any time. The other way of constructing the ratchet-teeth consists in having the axis of the same slightly inclined, as shown in fig. 4, so that by the application of a wrench, and a suitable effort, the edges of the ratchet-teeth may be made to slip over the pawl and the nut unscrewed without breaking the pawl. The ratchet-teeth are constructed according to this latter plan in those cases where it is necessary, occasionally, to unscrew the nut from the bolt. In either form of ratchet-teeth, however, it is impossible for the nut to become casually unscrewed.

This device will not augment, in an appreciable degree, the cost of the manufacture of screw-bolts. The washer C, with its pawl D, may be punched or cut out from a sheet-metal plate at one operation, and the ratchet-teeth $f$ may be pressed or swaged in the nut E during the process of manufacturing the same.

Having thus described our invention, we claim as new, and desire to secure by Letters Patent—

The washer C, constructed as described, provided with the concentric pawl D, cut from it, and adapted to fit into the ratchet-teeth $f$ formed in the chamber of the nut E, to prevent the said nut from turning off the bolt B, as herein shown and described.

The above specification of our invention signed by us, this 24th day of July, 1867.

D. ELLIOT,
E. SEELY.

Witnesses:
J. A. SERVICE,
ALEX. F. ROBERTS.